United States Patent Office 3,132,121
Patented May 5, 1964

3,132,121
EPOXY CONTAINING RESINS
Ivan Pascal, Wilmington, Del., assignor to E. I. du Pont de Nemours and Company, Wilmington, Del., a corporation of Delaware
No Drawing. Filed Apr. 13, 1961, Ser. No. 102,672
6 Claims. (Cl. 260—80.5)

This invention is directed to new polymeric materials containing epoxy groups. More particularly, the present invention relates to copolymers or interpolymers of fluoroolefins with alkyl vinyl ethers and certain unsaturated epoxides. The copolymers comprise units of different monomers taken from each of the three respective different groups of unsaturated compounds. The novel copolymers of this invention are vulcanizable thermoplastic materials having a tenacious adhesion to the surface of a large variety of materials including natural and synthetic rubbers, fluorine-containing resins, silicone resins, nylon, metals, glass, ceramics, plastics, and the like. These new materials are also significantly distinguished by their chemical, thermal, oil, solvent, and electrical resistance and toughness. These properties well adapt the copolymers for such uses as casting, potting, encapsulating, sealing, coating, binding, impregnating and laminating.

An existing problem has been to find a more universally applicable vulcanizable or thermosetting composition than the compositions now available to provide strongly adherent coatings to a large number of different materials, particularly to flourine-containing resins.

To mention one specific need, for example, there is required a potting compound having high adhesion both before and after it is vulcanized to the many different surfaces which may be encountered in electrical equipment. An electrical assembly may call for a potting compound which simultaneously adheres strongly to several different insulation materials, including fluorocarbon and silicone resins to which it is difficult to make things stick, as well as to metal and glass in the same unit.

It is, therefore, an object of this invention to provide novel polymeric materials containing epoxy groups which can be crosslinked through the opening of the epoxy groups. It is a further object to provide pourable thermoplastic resins which are vulcanizable to tough resilient solids and adherent to the surface of many different materials including resins, plastics, rubbers, metals, glass. It is a further object of this invention to provide epoxy-containing copolymers obtained by the addition polymerization of selected monomeric components by means of free radical producing initiators, leaving the epoxy groups largely unaffected.

These and other objects will become apparent in the following description and claims.

More specifically, the present invention is directed to an epoxy-containing copolymer of (a) a polymerizable ethylenically unsaturated epoxide free from aromatic unsaturation and having the epoxide group non-adjacent to the double bond, (b) a halo- or trifluoromethyl-substituted ethylene containing at least one fluorine atom and having the formula:

$$\begin{array}{c} F \quad X \\ C=C \\ Y \quad X \end{array}$$

wherein X is hydrogen, fluorine, chlorine, or trifluoromethyl and Y is H or F, and (c) an alkyl vinyl ether wherein the allyl group is $C_1$ to $C_6$ straight or branched chain.

In said copolymer, for each mole of component (b) there may be from 0.01 mole to 2 moles of component (c) and from 0.01 mole to 1 mole of component (a).

The present invention also includes a vulcanized product obtained by mixing a copolymer, as heretofore described and hereinafter claimed, with a vulcanizing agent and subjecting the resulting composition to conditions under which cross-linking occurs.

The epoxy monomers utilized according to the present invention are illustrated by such compounds as vinyl glycidyl ether, allyl glycidyl ether, glycidyl acrylate, glycidyl methacrylate, and 1,2-epoxy-4-vinyl cyclohexane. The preferred epoxy monomer for the preparation of polymers for use as potting compounds is allyl glycidyl ether.

Polymerizable fluoroolefins which can be used in the preparation of the copolymers of this invention include:

| | |
|---|---|
| Vinyl fluoride | $CH_2=CHF$ |
| Vinylidene fluoride | $CH_2=CF_2$ |
| Tetrafluoroethylene | $CF_2=CF_2$ |
| Chlorotrifluoroethylene | $CClF=CF_2$ |
| 1,1-dichloro-2,2-difluoroethylene | $CCl_2=CF_2$ |
| 2-chloro-1,1-difluoroethylene | $CHCl=CF_2$ |
| Trifluoroethylene | $CHF=CF_2$ |
| Hexafluoropropene | $CF_3-CF=CF_2$ |
| Pentafluoro-2-(trifluoromethyl) propene | $CF_2=\underset{\underset{CF_3}{|}}{C}CF_2$ |

The preferred fluoroolefin is tetrafluoroethylene.
The alkyl vinyl ethers which may be used in the practice of this invention include:

Methyl vinyl ether
Ethyl vinyl ether
Propyl vinyl ether
Isopropyl vinyl ether
Butyl vinyl ether
Isobutyl vinyl ether
Hexyl vinyl ether Each of the three different groups of monomers heretofore described may be represented in the monomer mixture and resultant polymer by one or more of the polymerizable compounds of each group. That is, a mixture of allyl glycidyl ether and glycidyl methacrylate, for example, can be used as well as either epoxy-containing compound in combination with a fluoroolefin and an alkyl vinyl ether. Also, mixtures of fluoroolefins such as a mixture of tetrafluoroethylene and vinyl fluoride, and a mixture of hexafluoropropene and 1,1-difluoroethylene can be used in combination with an epoxy-containing monomer or mixture of epoxy-containing monomers and an alkyl vinyl ether. Similarly, mixed alkyl vinyl ethers can be employed to produce the novel products of this invention.

The desired relative proportions of the monomers are polymerized in the presence of a chain-transfer agent, optionally an acid acceptor, and a polymerization initiator in bulk, i.e. without an added diluent, in solution, or in an aqueous emulsion. Preferably the polymerization reaction is carried out in an unpolymerizable organic solvent which may or may not be a solvent for the polymer. A reactor made of or lined with silver, stainless steel, monel metal, or the like and capable of holding several hundred atmospheres of pressure is employed. Batch or continuous processes, when solution and emulsion polymerization are run, are used to produce these copolymers.

The use of a solvent as a reaction medium for the production of the copolymers of this invention facilitates handling of the reactants and the products. Particularly, in a continuous polymerization process, the solvent can act as a convenient carrier of the liquid monomers, chain transfer agent, and polymerization initiator and provide a means of ready control of the relative concentrations of these materials. Solutions of the products are often easier to handle than viscous liquid or semi-solid products. The solvent for the monomer, however, does not have to be a solvent for the polymer; the insoluble polymer may be dispersed in the solvent and handled as a slurry. A solvent can also act as a heat exchange medium to dissipate the heat of polymerization. In addition, a solvent can function as a reactant of the chain transfer or telogen type and thus help control the molecular weight or the viscosity of the polymeric product.

Suitable solvents which may be utilized in the practice of this invention include nonpolymerizable aliphatic or alicyclic hydrocarbons, halocarbons, halohydrocarbons, alcohols, and ketones. To facilitate the removal and recovery of the solvent from the solution of the polymeric product, the solvent should have a boiling point of 150° C. or less at 760 mm. pressure, and preferably of 100° C. or less. Compounds which can be used as liquid reaction media include hexane, heptane, octane, cyclohexane, methylcyclohexane, carbon tetrachloride, chloroform, tetrachloroethylene, 1,1,1-trichlorotrifluoroethane, 1,1,2-trichlorotrifluoroethane, fluorotrichloromethane, 1,2-difluorotetrachloroethane, 1,3-bis(trifluoromethyl)perfluorocyclobutane, methanol, ethanol, 1-propanol, 2-propanol, 1-butanol, 2-butanol, 2-methyl-2-propanol, acetone, 2-butanone. It will be usually preferred to employ heptane or one or both of the isomeric trichlorotrifluoroethanes. Mixtures of any two or more of such solvents named herein may be used, if desired.

The choice of a solvent will depend upon the amount of solvent reaction in the copolymerization that is desired; solvents which have relatively high reactivity and act as relatively strong telogens or chain transfer agents will lead to low molecular weight products. The amount of solvent employed will vary from about 0.1 part to about 20 parts by weight for each part of total monomers to be copolymerized. As little as 0.1 of a part of solvent will be found to reduce the viscosity of a polymeric product of the invention while the dilution obtained with more than 20 parts of solvent becomes excessive. The preferred amount of solvent is 0.5 part to 2 parts per part of total monomers. The copolymerization may, of course, be carried out in the absence of any solvent.

A chain-transfer agent is one which can terminate a growing polymer chain, generating in this process another free radical which can start another chain. It is used to obtain low molecular weight polymers which may be fluids or low melting solids. A chain-transfer agent can be the solvent, a compound added in relatively small amount to the monomer mixture or to a solution of the monomers in a solvent, or both the solvent and an added agent; sometimes the only distinction between the solvent and the chain-transfer agent is that the solvent is employed in a relatively larger amount to act both as a reactant and as a reaction medium.

Compounds which are suitable chain-transfer agents for use in the copolymerization according to the present invention are those, in general, which have an active hydrogen atom. This group includes compounds as isobutane, methylcyclohexane, 1-dodecanethiol, ethyl ether, isopropyl ether, cyclohexyl ether, tetrahydrofuran, 2-propanol, and the like. Preferably, volatile chain-transfer agents having a boiling point of 150° C. or less are employed to simplify the removal of unreacted material from the reaction products. The chain-transfer agent can be used in an amount from about 0.1%, based on the total monomers present, to such high concentrations that the agent may also be considered a solvent. The actual amount which will be used will depend upon the reactivity of the particular agent selected and upon the molecular weight or viscosity of the polymeric product which is desired.

When the highest molecular weight thermoplastic polymers are desired, the chain-transfer agent is eliminated and the solvent, if one is used, is relatively inert.

The acid acceptor which can be utilized in the practice of this invention is an anhydrous metal carbonate or oxide which neutralizes minor amounts of hydrofluoric acid that may appear in the polymerizing mixture. The acid can be an impurity in the starting fluoroolefin monomer component of the system or it can be a by-product of the polymerization; its origin is not always known, but its presence tends to destroy epoxy groups, and products which have a lower epoxy content and are consequently slower to crosslink are obtained. Acid scavenging agents which can be used are the anhydrous form of such compounds as potassium carbonate, sodium carbonate, calcium carbonate, magnesium carbonate, aluminum oxide, barium oxide, calcium oxide, magnesium oxide. The amount of the acid scavenger will vary from about 0.1% to about 10% by weight of the total monomers taken for polymerization, a preferred amount being 1% to 5%.

It will be understood that, while the presence of an acid scavenger or acceptor helps preserve the epoxy group during the copolymerization, the polymerization reaction can be run in the absence of such an agent and useful polymeric products will be obtained.

An organic free-radical generating polymerization initiator is required to initiate the copolymerization among the fluoroolefin, alkyl vinyl ether, and epoxy compound and to produce the polymeric products of this invention. Such initiators are well known and are conventionally employed as catalysts for the polymerization of olefins. Suitable initiators for the copolymerization in bulk or solution are organic peroxides, which include alkyl peroxides such as diethyl peroxide, tert-butyl hydroperoxide, di-tert-butyl peroxide, and the acyl peroxides such as acetyl peroxide, heptafluorobutyryl peroxide, lauroyl peroxide, and benzoyl peroxide; and the organic azo initiators such as 2,2'-azodiisobutyronitrile, and 2,2'-azobiz-(2,4-dimethyl-4-methoxyvaleronitrile). The preferred initiators are the organic peroxides, particularly the acyl peroxides. Benzoyl peroxide is most preferred because it is active at a desired temperature range, it is readily available commercially, is stable in storage, and is easily handled.

Usually, the amount of initiator employed will be from about 0.2% to about 4% by weight based on the total monomer mixture, preferably 1% to 2% by weight, particularly with benzoyl peroxide as the initiator.

In an emulsion copolymerization, in addition to the above-mentioned organic free radical generating initiators, such inorganic initiators as sodium peroxide, barium peroxide, ammonium persulfate, potassium persulfate, and the like can be used.

The copolymerization may be carried out at a temperature of from about 25° C. to about 200° C., the particular temperature employed being dependent primarily upon the particular organic free-radical generating initiator employed. As is well known, different initiators decompose at different temperatures, and the temperature employed will be adjusted in accord with the stability of the initiator so that it will decompose and generate its free radicals at a reasonable rate and at which the free radicals can be usefully employed in promoting the reaction. Below 25° C. the reaction tends to become too slow to be practical. Above 200° C. there is a tendency for the epoxy ring to open with not only a loss of epoxy groups but with a resultant undesirable premature insolubilizing and stiffening of the polymer by crosslinking. The reaction can be carried out at a temperature of about 25° C. by employing an initiator such as heptafluorobutyryl peroxide. The reaction can be carried out at about 80° C. by employing such an initiator as benzoyl peroxide. The reaction can be carried out at about 120° C. to about 150° C. by employing di-tert-butyl peroxide as the initiator. It is preferred to employ benzoyl peroxide at a temperature of from about 70° C. to about 100° C. Higher temperatures tend to give lower molecular weight products.

The pressure under which the polymerization is carried out can be the autogenous pressure of the gaseous monomers at the polymerization temperature or it can be a superimposed pressure of one to 1500 atmospheres. The superimposed pressure can be produced by an extraneous inert gas, such as nitrogen or carbon dioxide, as well as by the gaseous monomers.

The novel copolymers of the present invention vary from viscous fluids to low and high melting plastic materials. The fluidity and melting temperature of the products depends upon such factors as the nature and proportion of the monomers selected for the copolymerization, the type and amount of the chain-transfer agent present, and the temperature of the polymerization. Copolymers made with allyl glycidyl ether, for example, tend to be more fluid or lower melting than the copolymers made with glycidyl methacrylate. The use of increased relative amounts of allyl glycidyl ether in the monomer mixture increases the fluidity of the copolymer. The effect of the type and amount of the chain-transfer agent and of the temperature has already been discussed.

For general use as a potting, encapsulating, and sealing compound, a copolymer which is a viscous fluid pourable at room temperature is preferred to a plastic product which must be heated to render it fluid. The epoxy-containing copolymers of this invention can be compounded with a variety of crosslinking agents to convert the fluid or thermoplastic compositions into resilient, tough, stable, vulcanizates. With proper compounding, such as with a mixture of mono- and dibutyl phosphotates or of mono- and diisooctyl phosphates as crosslinking agents, transparent vulcanizates are obtained. Such vulcanizates are particularly useful in the electronic field because they render visible the condition of the component parts of an assembly and may permit the detection of failure by visual inspection.

A significant property which makes the present novel copolymers particularly useful is its wetting of and capability of strong adhesion to practically all surfaces, including those of polytetrafluoroethylene, tetrafluoroethylene copolymers, and silicone resins commonly used for electrical insulation and which are, however, strongly antiadherent toward most materials. The wetting by the present novel copolymers of these resins as well as of plastics, rubbers, glass and metals which may also be present in an electrical assembly provides thorough adhesion to all parts of an assembly by the freshly applied potting, encapsulating, or sealing compound and leads to strong, ultimate bonding of the crosslinked product to the surfaces with which it comes into contact.

Other properties of the crosslinked copolymers of this invention which make them significantly valuable, are their good electric insulation properties, resistance to cutting and chipping, and resistance to heat, oils, solvents, and chemicals.

The compounding and curing of the novel copolymers of this invention are accomplished by well-known procedures for the compounding and curing of epoxy resins as set forth, for example, by Lee and Neville in "Epoxy Resins," McGraw-Hill Book Co., 1957. The fluid copolymers are compounded by mixing the resin and curing agent with a suitable stirrer. Copolymers which are plastic solids at room temperature but which become fluid when heated can be mixed hot in heating baths to control the temperature during stirring. Products which have high melting ranges can be compounded in a plastic state by mixing in a heavy duty internal mixer.

The curing or crosslinking agent for the epoxy resins is a compound which contains an acidic or basic group capable of reacting with the epoxy group of the resin. A bifunctional curing agent provides crosslinks between copolymer chains at the epoxy sites, and a monofunctional curing agent opens the epoxy ring to permit reaction with a second epoxy group and provides a crosslink. Curing agents include aliphatic and aromatic amines and diamines, cyclic aliphatic amines, dibasic organic acids, acid anhydrides, mono- and dialkyl phosphates. Specific representative crosslinking agents are ethylenediamine, diethylenetriamine, 1,4 - butanediamine, 1,6 - hexanediamine, m-phenylenediamine, 4,4' - methylenedianiline, benzyldimethylamine, piperidine, oxalicacid, maleic anhydride, phthalic anhydride, 50:50 mixture of mono- and dibutyl phosphate. In addition to the curing agent, an epoxy resin may be compounded with fillers such as clays, whiting, carbon black and the like, plasticizers, coloring pigments, etc.

The heretofore-described compounded epoxy resins can be applied in potting, encapsulating, sealing, and coating by such means as pouring, brushing, troweling, extruding from a gun. Hand guns are convenient, for example, for potting connectors, coating strain gages, etc. Spray equipment may also be used to apply the compounded resin.

The crosslinking of the compounded resin is accomplished from room temperature to 200° C. For curing other than at the ambient temperature, ovens, infrared lamps and high frequency heaters can be used. Curing can also be done with the aid of ultrasonic vibrations, and electron and electromagnetic radiation. In general the degree and rate of crosslinking under a given set of conditions depends upon the epoxy content of the resin and the amount and activity of the curing agent.

Mention has been made herein of such uses of the present novel copolymers, as for potting, i.e., the deep embedment and thorough impregnation of articles and assemblies of equipment; encapsulating, i.e., the surrounding or capsulating an item with shielding material; sealing, i.e., closing off a portion of a device against the environment; coating of surfaces; binding in the preparation of laminates of paper, cloth, fiber glass, wood sheets and the like; and for versatile adhesion. In each of these uses the resin provides insulation against moisture, impact, chemical attack, oxidation, and electrical currents.

Representative examples illustrating the present example follow.

EXAMPLES 1 TO 26

A 400 ml. stainless steel shaker tube was charged with an unsaturated epoxide, an alkyl vinyl ether, solvent, chain-transfer agent, acid acceptor, and polymerization initiator of the nature and amount given in Table I which follows. The tube was then closed, cooled in a solid carbon dioxide-acetone bath, evacuated, and filled with pure nitrogen. While still cold the tube was placed on the shaker and charged by condensation with the desired quantity of fluoroolefin. The tube and its contents were heated electrically to the desired temperature while under agitation and the polymerization allowed to proceed for from about 4 hours to about 8 hours or until no further pressure drop was observed. The reaction mixture was cooled to room temperature, removed from the tube, and allowed to stand at room temperature to permit escape of gaseous materials. The mixture was then filtered to remove the acid acceptor, and the solvent, chain-transfer agent, and any unreacted monomers were removed by evaportaion under vacuum. The polymeric residue was weighed and characterized by elemental analysis and epoxide number determination. The epoxide number is the fractional molecular equivalent of epoxide contained in 100 grams of the copolymer.

The ingredients with the amounts used in a series of polymerizations together with the weight and results of analysis of the end products are presented in Table I.

*Table I*

| Example | (a) Unsaturated epoxide | G. | Mole | (b) Fluoroolefin | G. | Mole |
|---|---|---|---|---|---|---|
| 1 | Allyl glycidyl ether | 57 | 0.5 | Tetrafluoroethylene | 50 | 0.5 |
| 2 | do | 28.5 | 0.25 | do | 50 | 0.5 |
| 3 | do | 28.5 | 0.25 | do | 50 | 0.5 |
| 4 | do | 38 | 0.33 | do | 50 | 0.5 |
| 5 | do | 5.7 | 0.05 | do | 50 | 0.5 |
| 6 | do | 11.4 | 0.1 | do | 50 | 0.5 |
| 7 | do | 28 | 0.25 | do | 50 | 0.5 |
| 8 | do | 57 | 0.5 | do | 50 | 0.5 |
| 9 | do | 5.7 | 0.05 | do | 50 | 0.5 |
| 10 | do | 28.5 | 0.25 | do | 50 | 0.5 |
| 11 | do | 11.4 | 0.1 | do | 50 | 0.5 |
| 12 | do | 57 | 0.5 | Tetrafluoroethylene / Vinyl fluoride | 15 / 16 | 0.15 / 0.35 |
| 13 | do | 11.4 | 0.1 | Hexafluoropropene / 1,1-difluoroethylene | 19 / 24 | 0.125 / 0.375 |
| 14 | do | 11.4 | 0.1 | Chlorotrifluoroethylene | 58 | 0.5 |
| 15 | do | 28.5 | 0.25 | Tetrafluoroethylene | 50 | 0.5 |
| 16 | do | 5.88 | 0.05 | do | 50 | 0.5 |
| 17 | do | 0.58 | 0.005 | do | 50 | 0.5 |
| 18 | Glycidyl methacrylate | 28.4 | 0.2 | do | 50 | 0.5 |
| 19 | do | 14.2 | 9.1 | do | 50 | 0.5 |
| 20 | do | 14.2 | 0.1 | do | 50 | 0.5 |
| 21 | do | 14.2 | 0.1 | do | 50 | 0.5 |
| 22 | do | 14.2 | 0.1 | do | 50 | 0.5 |
| 23 | do | 7.1 | 0.05 | do | 50 | 0.5 |
| 24 | do | 71 | 0.5 | do | 50 | 0.5 |
| 25 | do | 14.2 | 0.1 | do | 50 | 0.5 |
| 26 | 1,2-epoxy-4-vinyl cyclohexane | 31 | 0.25 | do | 50 | 0.5 |

| Example | (c) Alkyl vinyl ether | G. | Mole | Solvent | Ml. | Chain-transfer agent | Ml. |
|---|---|---|---|---|---|---|---|
| 1 | Ethyl vinyl ether | 72 | 1.0 | Heptane | 95 | Tetrahydrofuran | 5 |
| 2 | do | 72 | 1.0 | do | 95 | do | 5 |
| 3 | do | 72 | 1.0 | do | 95 | do | 5 |
| 4 | do | 60 | 0.83 | do | 142.5 | do | 7.5 |
| 5 | do | 72 | 1.0 | None | | do | 100 |
| 6 | do | 72 | 1.0 | Heptane | 50 | do | 50 |
| 7 | do | 72 | 1.0 | do | 75 | do | 25 |
| 8 | do | 72 | 1.0 | do | 100 | None | |
| 9 | do | 72 | 1.0 | do | 100 | do | |
| 10 | do | 72 | 1.0 | do | 80 | do | |
| 11 | do | 72 | 1.0 | do | 100 | do | |
| 12 | do | 72 | 1.0 | None | | do | |
| 13 | do | 72 | 1.0 | Heptane | 100 | do | |
| 14 | do | 72 | 1.0 | do | 100 | do | |
| 15 | do | 72 | 1.0 | do | 90 | Tetrahydrofuran | 10 |
| 16 | do | 3.6 | 0.05 | 1,1,2-trichloro trifluoroethane | 125 | None | |
| 17 | do | 0.36 | 0.005 | do | 125 | do | |
| 18 | do | 72 | 1.0 | None | | Tetrahydrofuran | 80 |
| 19 | do | 72 | 1.0 | do | | do | 90 |
| 20 | do | 72 | 1.0 | Heptane | 100 | None | |
| 21 | Isobutyl vinyl ether | 100 | 1.0 | None | | do | |
| 22 | n-Butyl vinyl ether | 100 | 1.0 | do | | do | |
| 23 | Ethyl vinyl ether | 108 | 1.5 | do | | do | |
| 24 | do | 72 | 1.0 | do | | do | |
| 25 | do | 97 | 1.35 | do | | do | |
| 26 | do | 72 | 1.0 | Heptane | 90 | Tetrahydrofuran | 10 |

| Experiment | Acid acceptor | G. | Initiator | G. | Temperature of polymerization, °C | Weight of copolymer in g. |
|---|---|---|---|---|---|---|
| 1 | CaCO₃ | 2 | Benzoyl peroxide | 2 | 85 | 121 |
| 2 | CaCO₃ | 2 | do | 2 | 85 | 121 |
| 3 | CaCO₃ | 2 | Di-t-butyl peroxide | 1 | 135 | 125 |
| 4 | CaCO₃ | 2 | Benzoyl peroxide | 2 | 85 | 121 |
| 5 | None | | do | 2 | 85 | 139 |
| 6 | CaCO₃ | 2 | do | 2 | 85 | 116 |
| 7 | CaCO₃ | 2 | do | 2 | 85 | 121 |
| 8 | CaCO₃ | 2 | do | 2 | 85 | 124 |
| 9 | CaCO₃ | 2 | do | 2 | 85 | 116 |
| 10 | K₂CO₃ | 2 | do | 2 | 85 | 110 |
| 11 | None | | do | 2 | 85 | 121 |
| 12 | do | | do | 2 | 85 | 92.0 |
| 13 | MgCO₃ | 4 | do | 2 | 85 | 13.0 |
| 14 | CaCO₃ | 2 | do | 2 | 85 | 25.0 |
| 15 | CaCO₃ | 2 | do | 2 | 85 | 96.0 |
| 16 | None | | Di-t-butyl peroxide | 1 | 135 | 50.0 |
| 17 | do | | do | 1 | 135 | 52.0 |
| 18 | K₂CO₃ | 2 | Benzoyl peroxide | 2 | 85 | 123 |
| 19 | K₂CO₃ | 2 | do | 2 | 85 | 128 |
| 20 | CaCO₃ | 2 | do | 2 | 85 | 119 |
| 21 | CaCO₃ | 2 | do | 2 | 85 | 103 |
| 22 | CaCO₃ | 2 | do | 2 | 85 | 123 |
| 23 | K₂CO₃ | 2 | do | 2 | 85 | 110 |
| 24 | MgCO₃ | 4 | do | 2 | 85 | |
| 25 | K₂CO₃ | 4 | do | 2 | 85 | |
| 26 | CaCO₃ | 2 | do | 2 | 85 | 63 |

Table I—Continued

| Example | Percent C | Percent H | Percent F | Epoxide No. of copolymer | Physical state of copolymer | Viscosity of copolymer |
|---|---|---|---|---|---|---|
| 1 | 48.9 | 5.9 | 27.5 | 0.290 | Viscous fluid | 4,500 cps.[1] |
| 2 | 47.3 | 5.8 | 34.0 | 0.152 | ----do---- | >100,000 cps. |
| 3 | 47.0 | 5.7 | 32.9 | 0.13 | ----do---- | (2). |
| 4 | 47.5 | 5.7 | 33.7 | 0.110 | ----do---- | (2). |
| 5 | 48.9 | 5.1 | 39.5 | 0.018 | ----do---- | (2). |
| 6 | 45.4 | 5.3 | 36.1 | 0.048 | ----do---- | (2). |
| 7 | 46.4 | 5.7 | 33.8 | 0.119 | ----do---- | (2). |
| 8 | 48.1 | 5.7 | 32.2 | 0.211 | ----do---- | (2). |
| 9 | 44.0 | 5.1 | 41.2 | 0.0165 | ----do---- | $\eta_i = <0.1$.[3] |
| 10 | 45.6 | 5.3 | 38.7 | 0.117 | ----do---- | $\eta_i = 0.13$. |
| 11 | 43.8 | 5.4 | 37.9 | 0.045 | ----do---- | $\eta_i = 0.20$. |
| 12 | 47.6 | 6.4 | 31.8 | 0.20 | ----do---- | $\eta_i = 0.16$. |
| 13 | 50.1 | 6.0 | 27.6 | 0.040 | ----do---- | $\eta_i = 0.03$. |
| 14 | 47.2 | 5.8 | 34.6 | 0.06 | ----do---- | (2). |
| 15 | 44.1 | 5.3 | 24.0 | 0.109 | ----do---- | (2). |
| 16 | 31.2 | 2.1 | 57.4 | (2) | Tough wax-like solid | $\eta_i = 0.1$. |
| 17 | 24.9 | 0.3 | 72.6 | (2) | Brittle wax-like solid | (2). |
| 18 | 46.2 | 5.4 | 33.7 | 0.113 | Viscous fluid | (2). |
| 19 | 45.8 | 5.4 | 36.7 | 0.068 | ----do---- | $\eta_i = 0.187$. |
| 20 | 45.1 | 5.9 | 38.3 | 0.076 | Plastic solid | (2). |
| 21 | 51.5 | 6.5 | 30.1 | 0.086 | ----do---- | $\eta_i = 0.20$. |
| 22 | 50.9 | 6.5 | 26.7 | 0.080 | ----do---- | $\eta_i = 0.39$. |
| 23 | 45.3 | 5.7 | 37.8 | (2) | ----do---- | $\eta_i = 0.25$. |
| 24 | (2) | (2) | (2) | (2) | Tough, white plastic solid | $\eta_i = 0.34$. |
| 25 | (2) | (2) | (2) | (2) | ----do---- | (2). |
| 26 | 49.4 | 5.8 | 35.0 | 0.119 | Viscous fluid | (2). |

[1] Measured with Brookfield viscometer at 25° C.
[2] No data.
[3] Inherent viscosity, 1% solution in tetrahydrofuran.

EXAMPLE 27
COMPOUNDING AND CURING OF COPOLYMER

With 10 parts of the fluid copolymer of Example 2 were mixed 1.15 parts of an equimolar mixture of monoisooctyl and diisooctyl acid ortho-phosphate with stirring. The resultant composition was poured into a mold and allowed to stand for 48 hours at room temperature. During this time the original fluid copolymer was crosslinked to a flexible, highly resilient, translucent solid.

When the above molding and curing was repeated with strips of aluminum, copper, and steel metal, pieces of polytetrafluoroethylene resin coated wire, sections of glass rod, pieces of porcelain, rods of formaldehyde-phenol type of plastic, plates of poly methyl methacrylate, and strips of nylon imbedded in the composition the fluid polymer readily wet the surfaces of these different objects. After the copolymer solidified on standing the crosslinked resin adhered firmly to the metals, polytetrafluoroethylene, glass, porcelain, plastics, and nylon.

EXAMPLE 28

Wires insulated with polytetrafluoroethylene resin were soldered to the inside (inner) terminals of an 8-terminal solid shell straight aluminum cable connector plug. The air-space between the terminals, connected to the wires and situated inside the back shell of the connector plug, was filled with the liquid polymer described in, and compounded as in Example 27.

After standing at room temperature for 24 hours, the initially liquid polymer solidified to a flexible, highly resilient, translucent material providing a tight seal around the wires leading to the terminals of the cable connector plug.

It is understood that the preceding examples may be varied, both as to reactants and reaction conditions, within the scope of the present total specification as understood by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An epoxy containing copolymer consisting essentially of (a) a polymerizable ethylenically unsaturated epoxide free from aromatic unsaturation and having the epoxide group non-adjacent to the double bond, (b) at least one substituted ethylene having the formula $$\begin{array}{c} F \quad X \\ C = C \\ Y \quad X \end{array}$$

wherein X is selected from the group consisting of hydrogen, fluorine, chlorine, and trifluoromethyl, Y is selected from the group consisting of H and F, and (c) an alkyl vinyl ether wherein the alkyl group is a $C_1$ to $C_6$ straight and a $C_1$ to $C_6$ branched saturated hydrocarbon radical; and wherein for each mole of said substituted ethylene there is present from 0.01 mole to 2 moles of said alkyl vinyl ether and from 0.01 to 1 mole of said epoxide.

2. A copolymer of claim 1 wherein the component (a) is allyl glycidyl ether and component (c) is ethyl vinyl ether.

3. A copolymer of claim 1 wherein the component (a) is allyl glycidyl ether, component (b) is tetrafluoroethylene and component (c) is ethyl vinyl ether.

4. A copolymer of claim 1 wherein component (c) is methyl vinyl ether.

5. A copolymer of claim 1 wherein component (a) is vinyl glycidyl ether.

6. The vulcanized product obtained by mixing a copolymer according to claim 1 with a vulcanizing agent followed by vulcanizing the resulting composition.

References Cited in the file of this patent
UNITED STATES PATENTS

| | | |
|---|---|---|
| 2,626,252 | Tawney | Jan. 20, 1953 |
| 2,692,876 | Cupery | Oct. 26, 1954 |